United States Patent
Therrien et al.

(12) 
(10) Patent No.: US 6,659,266 B2
(45) Date of Patent: Dec. 9, 2003

(54) APPARATUS AND METHOD FOR FEEDING ELONGATED ELEMENTS

(75) Inventors: Guy Therrien, St-Côme (CA); Yves Barrette, Vimont (CA); Normand Biron, Blainville (CA)

(73) Assignee: Firme Cogites Inc., St-Georges (CA)

( * ) Notice: Subject to any disclaimer, the term of this patent is extended or adjusted under 35 U.S.C. 154(b) by 0 days.

(21) Appl. No.: 10/376,503

(22) Filed: Mar. 3, 2003

(65) Prior Publication Data

US 2003/0135301 A1 Jul. 17, 2003

Related U.S. Application Data

(63) Continuation of application No. 09/442,991, filed on Nov. 19, 1999, now Pat. No. 6,550,605.

(51) Int. Cl.[7] .................... B65G 19/00; B65G 47/24; B65G 17/34
(52) U.S. Cl. .................... 198/726; 198/415; 198/416; 198/413; 198/803.11
(58) Field of Search .................... 198/395, 400, 198/413, 415, 416, 626.5, 726, 817, 803.1, 803.11, 803.13

(56) References Cited

U.S. PATENT DOCUMENTS

| | | |
|---|---|---|
| 4,068,756 A | 1/1978 | Loewenthal |
| 4,185,672 A | 1/1980 | Vit et al. |
| 4,641,742 A | 2/1987 | Igarashi et al. |
| 4,708,237 A | 11/1987 | Buisson et al. |
| 4,928,810 A | 5/1990 | Hultberg |
| 5,052,885 A | 10/1991 | Foster |
| 5,328,021 A | 7/1994 | Calvert et al. |
| 5,360,099 A | 11/1994 | Culpepper et al. |
| 5,373,934 A | 12/1994 | Jackson et al. |
| 6,179,115 B1 | 1/2001 | de Guglielmo et al. |
| 6,550,605 B1 * | 4/2003 | Therrien et al. ............ 198/726 |

* cited by examiner

Primary Examiner—Donald P. Walsh
Assistant Examiner—Jeffrey Shapiro
(74) Attorney, Agent, or Firm—Ogilvy Renault; Robert Mitchell

(57) ABSTRACT

A wood-edger for cutting away irregularities left on the edges of wood products, such as planks or boards, comprises a succession of different transferring mechanisms cooperating to regulate the flow of wood products to be processed and to properly position the same for the ultimate edging operation.

13 Claims, 9 Drawing Sheets

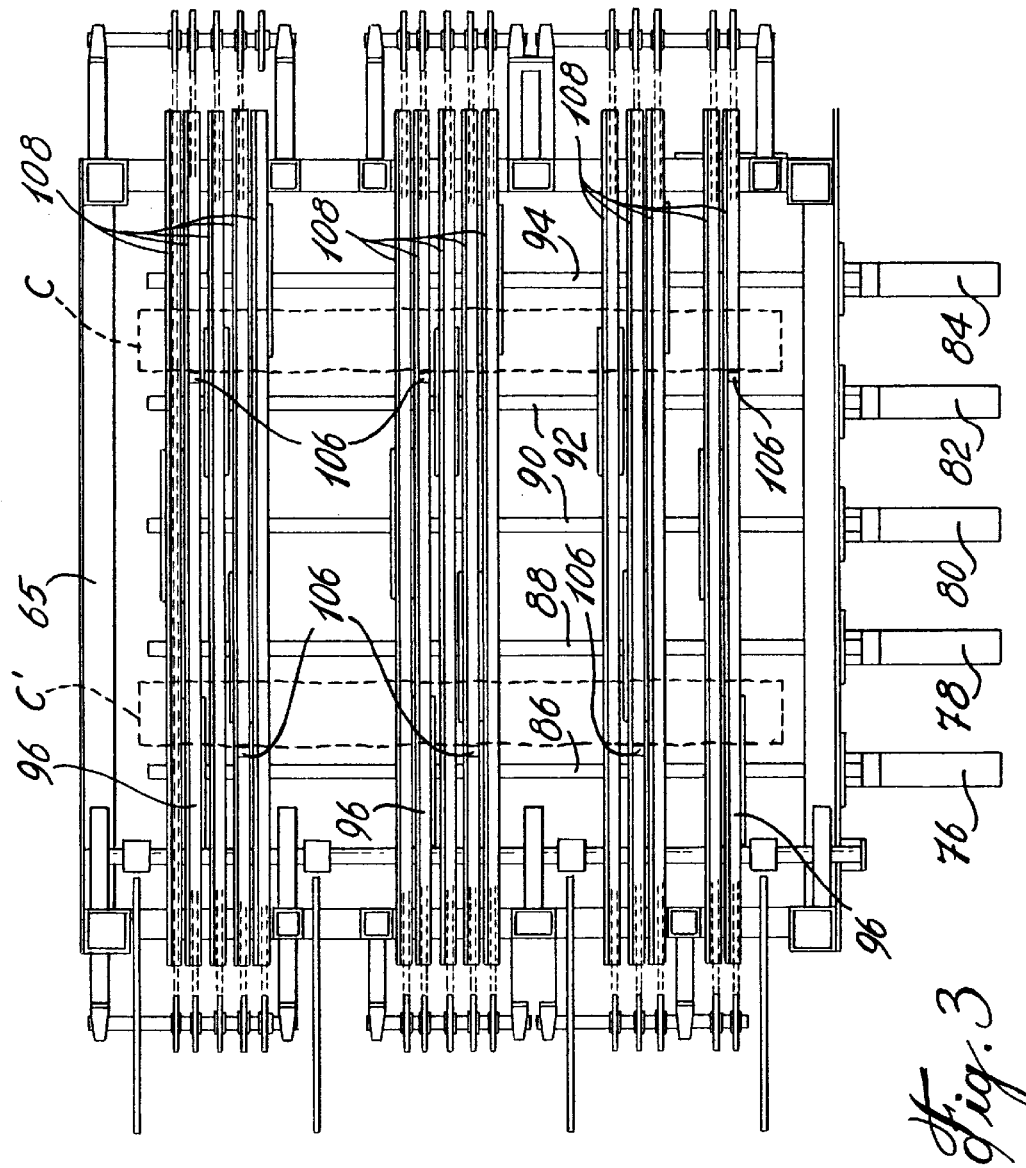

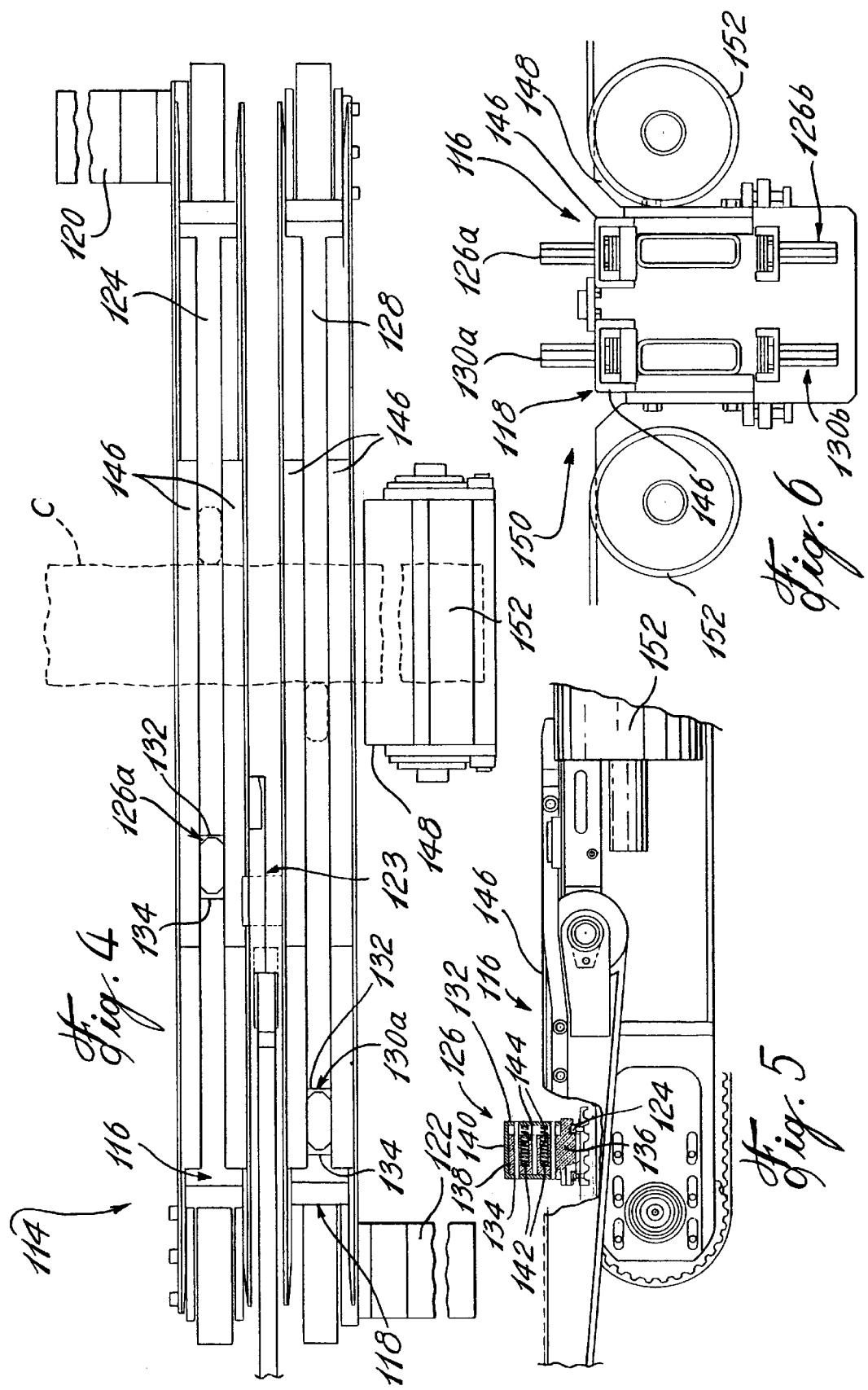

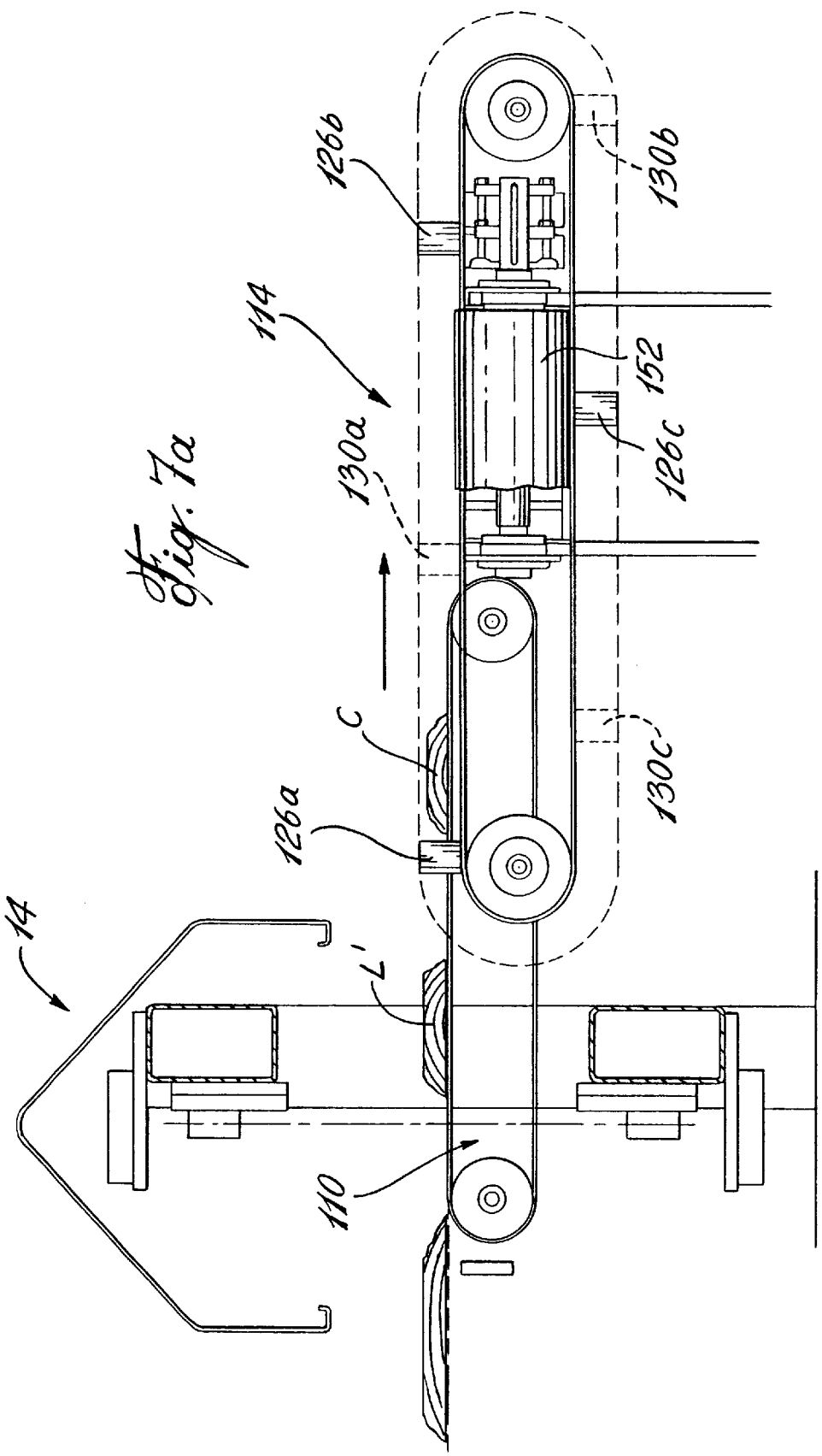

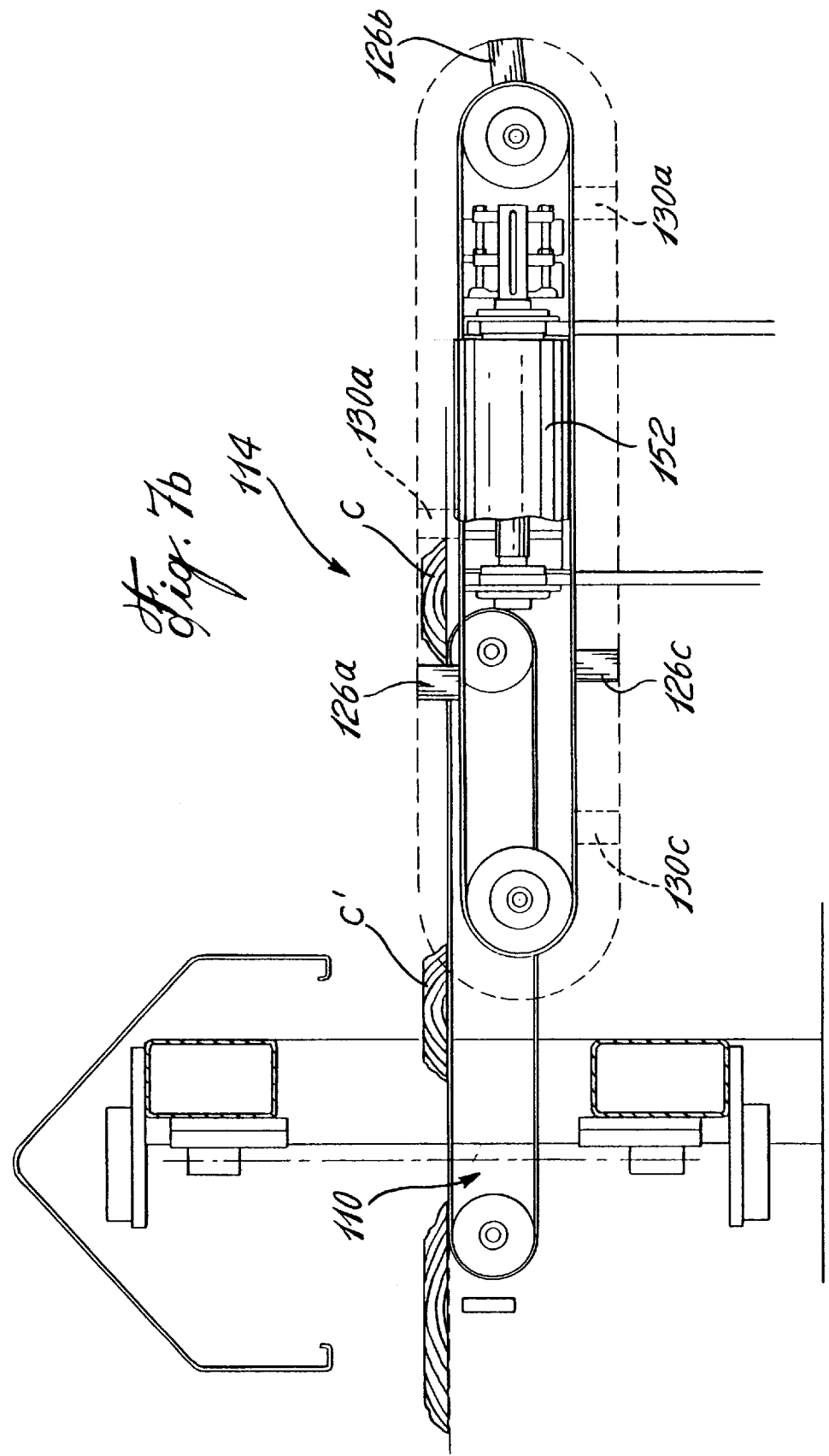

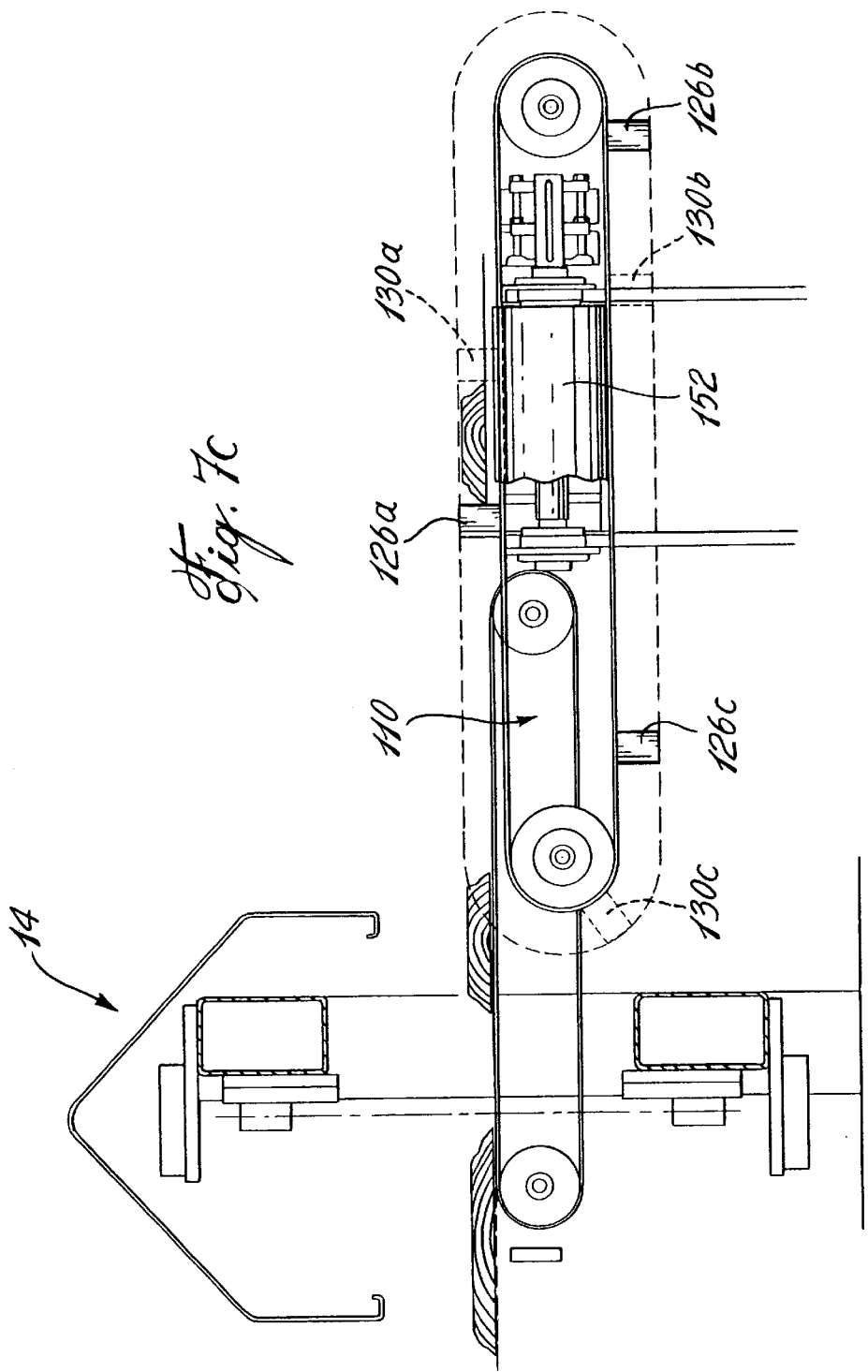

APPARATUS AND METHOD FOR FEEDING ELONGATED ELEMENTS

RELATED APPLICATION

This is a Continuation of U.S. patent application Ser. No. 09/442,991 filed on Nov. 19, 1999 now U.S. Pat. No. 6,550,605.

BACKGROUND OF THE INVENTION

1. Field of the Invention

The present invention relates to handling of elongated elements and, more particularly, pertains to a material-handling system which is suitable for use in sawmill operations.

2. Description of the Prior Art

A log entering a sawmill is initially sawed into lumber pieces (hereinafter referred to as cants) having flat and parallel top and bottom surfaces but unfinished longitudinal side surfaces or wanes. The wanes of a cant may be very irregular and are usually oblique to the top and bottom surfaces thereof. Accordingly, the cants have to be run through an edger to trim the wanes thereof such as to produce wood pieces having parallel side surfaces which are planar and perpendicular to the top and bottom surfaces thereof.

Conventional edgers generally comprise various transfer mechanisms which are adapted to transversally transport successive cants through a scanning station which is adapted to ascertain the profile of the cants. In accordance with calculations made on the basis of the profile data, the cants are conveyed and positioned on an infeed table of an edging station where the cants are longitudinally accelerated. Typically, the infeed table comprises a series of driven rollers disposed at regular intervals along the longitudinal axis of a frame for supporting and moving the cants and a series of overhead pressing rollers adapted to engage the top surface of the cants. The overhead pressing rollers are displaceable between inoperative and operative positions by means of hydraulic cylinders. Brackets are provided to connect the hydraulic cylinders to the overhead pressing rollers.

Although the conventional mechanisms used to transfer the cants from an intake station, through a scanning station and then onto an infeed table of an edging station perform satisfactorily, it has been found that there is a need for new and simpler transfer mechanisms which are adapted to enhance the productivity of an edging apparatus.

For instance, conventional cant transfer mechanisms do not allow to fill unwanted gaps between successive cants resulting from problems during the loading thereof on an entry conveyor of the edger.

Moreover, actual cant transfer mechanisms do not permit changing the speed of the production line according to the length of each incoming successive cant, although shorter cants require less time to be processed. Accordingly, this limitation results in a lost of productivity.

Another problem associated with the actual cant transfer mechanism is the premature wear of the hydraulic cylinders of the overhead pressing rollers of the edger infeed table. This is mostly attributable to the vibrations transmitted to the rollers when the same are in contact with the top surface of the cants. Furthermore, according to the above-described construction of the pressing rollers, the traveling speed of the rollers is limited, since relatively severe impacts of the rollers against the top surface of the cants can damage the cylinders.

SUMMARY OF THE INVENTION

It is therefore an aim of the present invention to provide an apparatus which is adapted to feed elongated elements.

It is also an aim of the present invention to provide such an apparatus which is adapted to feed elongated elements at a substantially uniform rate.

It is a further aim of the present invention to provide such an apparatus which is well adapted to cooperate with a scanning station and an edging station of a wood edger.

It is still an aim of the present invention to provide transfer mechanisms which are adapted to enhance the productivity of an edger.

It is still an aim of the present invention to provide a means for increasing the service life of an overhead pressing roller.

Therefore, in accordance with the present invention, there is provided an apparatus for feeding elongated elements at a substantially uniform rate comprising a frame having a longitudinal axis, multiple axially extending conveying means disposed in laterally spaced relationship on said frame means and adapted to be selectively driven at various speeds to move successive incoming transversally extending elongated elements along said longitudinal axis such as to provide a regular feeding rate, and means for controlling operation of said conveying means.

In a more specific construction, said multiple conveying means are independently and successively driven to convey one incoming elongated element at a time, thereby allowing the accumulation of one elongated element per conveying means at a delivery end of said apparatus.

In accordance with another general aspect of the present invention, there is provided an apparatus for transferring and orienting successive cants on an infeed table of an edging station. The apparatus comprises a frame having a longitudinal axis and at least two axially extending conveying means disposed in lateral spaced-apart relationship on said frame for moving successive incoming cants in a direction transversal to longitudinal axes thereof. Each conveying means includes first and second endless driving members. The first and second endless driving members are respectively provided with at least one first engaging means and with at least one second engaging means. The first and second engaging means are adapted to cooperate to convey successive incoming cants along said longitudinal axis of said frame. The first and second engaging means each have opposed pushing and abutment sides. The apparatus further comprises reversible motor means for selectively driving said first and second endless driving members of said conveying means in a forward direction and a backward direction, and control means adapted to control the operation of said conveying means such as to transport successive incoming cants to the infeed table of the edging station by alternately wedging the same between said pushing side of said first engaging means and said abutment side of said second engaging means, and between said pushing side of said second engaging means and said abutment side of said first engaging means.

In a further construction in accordance with the present invention, the pushing side of each said first and second engaging means is provided with compressible means, whereas said abutment side thereof is substantially rigid.

In accordance with a further aspect of the present invention, there is provided a method of transporting successive elongated elements transversally of respective longitudinal axes thereof. The method comprises the steps of:

detecting a first incoming elongated element, positioning first engaging means adjacent a longitudinally extending upstream side of the first incoming elongated element, wedging the first incoming elongated element between said first engaging means and second engaging means located on a downstream side of the first incoming elongated element, moving said first and second engaging means in unison so as to transport said first incoming elongated element to a delivery location, moving said first and second engaging means away from said first incoming elongated element such as to position said first and second engaging means on the downstream and upstream sides of a second incoming elongated element, respectively, whereby said first and second engaging means alternately serve to push and retain the successive incoming elongated elements.

In accordance with a further aspect of the present invention there is provided an infeed table of an edging station adapted to cut away unfinished lengthwise extending wane surfaces of a cant to produce a dimensioned product as the cant is displaced therethrough along a prescribed edging path. The infeed table comprises infeed conveyor means for longitudinally displacing the cant into the edging station along the edging path, said infeed conveyor means including a supporting surface and a plurality of overhead roller pressing units, each said overhead roller pressing unit including first and second frame members pivotally mounted on a common pivot, said first frame member supporting a roller adapted to roll on the top surface of the cant, damping means disposed between said first and second frame members to absorb vibrations transmitted to said roller, and means for acting on said second frame member to displace said roller between an inoperative position wherein said roller is out of engagement with the cant and an operative position wherein said roller engages a top surface of the cant.

In accordance with a further aspect of the present invention there is provided an apparatus for feeding one element at a time, comprising frame means defining a longitudinal axis, a series of conveyors supported by said frame means and adapted to move incoming elements in a feeding direction parallel to said longitudinal axis, sensing means for detecting the space between successive incoming elements, and control means coupled to said sensing means and adapted to operate said conveyors to create a differential of speed between said conveyors such as to provide a desired spacing between the elements.

In accordance with a further aspect of the present invention there is provided a method for feeding one element at a time, wherein the elements are conveyed along a feeding direction by a series of conveyors, comprising the steps of: ascertaining the spacing between successive incoming elements, generating related spacing data, and on the basis of said spacing data, creating a differential of speed from one conveyor to another to provide a desired spacing between the elements.

BRIEF DESCRIPTION OF THE DRAWINGS

Having thus generally described the nature of the present invention, reference will now be made to the accompanying drawings, showing by way of illustration a preferred embodiment thereof, and in which:

FIG. 3 is a schematic top plan view of a scanner delivery station of the wood edger of FIG. 1;

FIG. 4 is a top plan view of one module of a positioning apparatus of the wood edger;

FIG. 5 is fragmentary cross-sectional view taken along lines 5—5 of FIG. 4 and showing the construction of a cant engaging member thereof;

FIG. 6 is a simplified end elevational view of the module of FIG. 4, showing the disposition of two rollers of an edger infeed table with respect thereto;

FIGS. 7a to 7d are schematic side elevational views of the positioning apparatus, illustrating the sequence of operations thereof;

DESCRIPTION OF THE PREFERRED EMBODIMENTS

Figure 1:
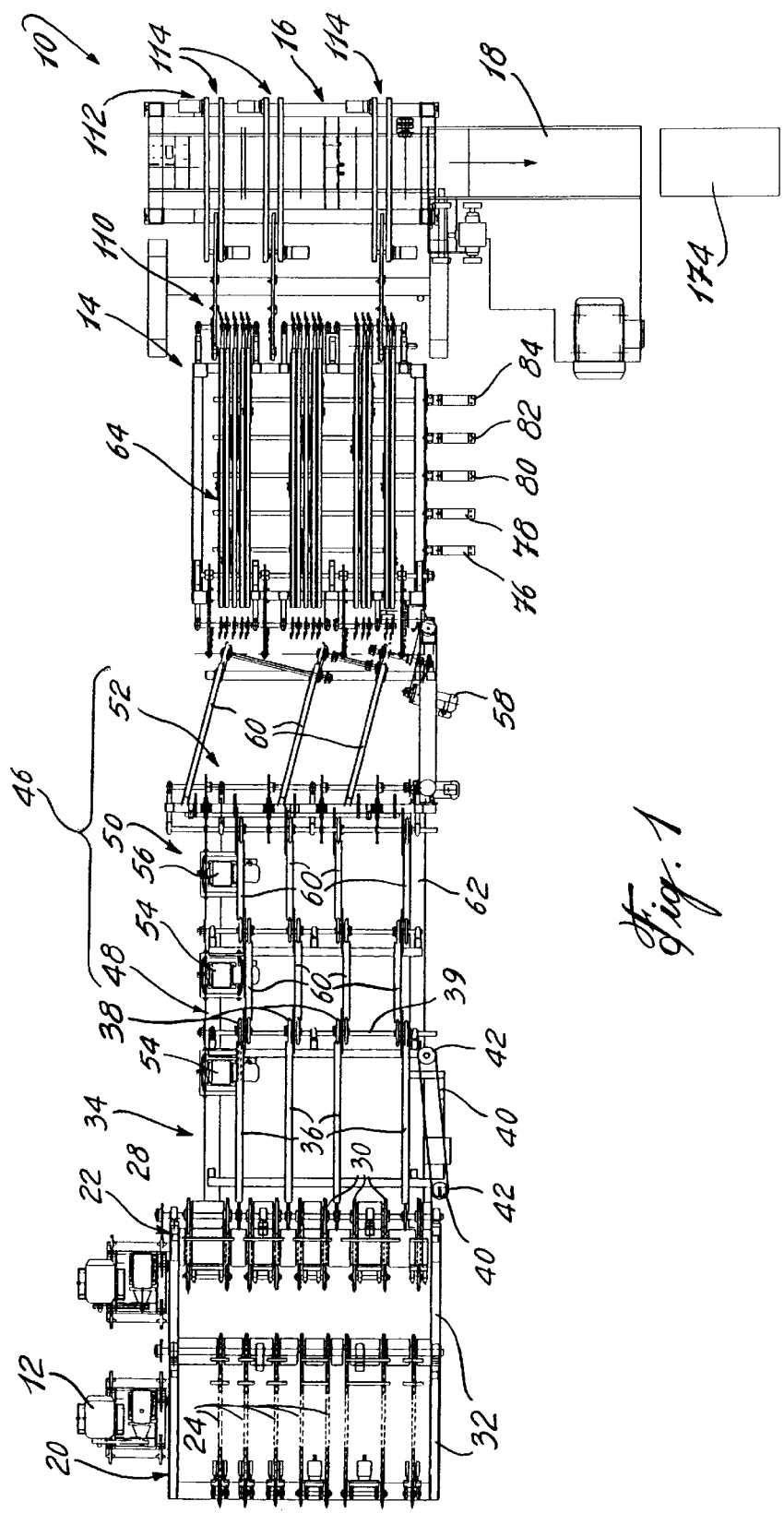
FIG. 1 is a schematic top plan view of a wood edger in accordance with the present invention.

Now referring to the drawings, and in particular to FIGS. 1 and 2, a wood edger in accordance with the present invention and generally designated by numeral 10 will be described.

The wood edger 10, as will be explained hereinafter, is adapted to cut away the irregularities or flaws left on the longitudinal side surfaces of elongated wood pieces or cants C cut from debarked logs. Accordingly, cants C having flat and parallel top and bottom surfaces and unfinished lengthwise extending wane surfaces may be converted into finished pieces having parallel side surfaces which are plane and perpendicular to the top and bottom surfaces thereof.

Basically, the wood edger 10 comprises a number of transfer or feeder mechanisms which are adapted to transversally transfer successive cants C from an intake station 12, through a scanning station 14, and then onto an infeed table 16 of an edging station 18 where the cants C are longitudinally accelerated.

The scanning station 14 detects the profile of the cants C and generates related data that are processed by a control system (not shown) to determine the position of the circular saws (not shown) of the edging stations 18 and to adjust the orientation of the cants C on the infeed table 16 before being fed through the edging station 18. This permits minimizing the amount of material to be trimmed so as to produce the largest possible product.

Figure 2:
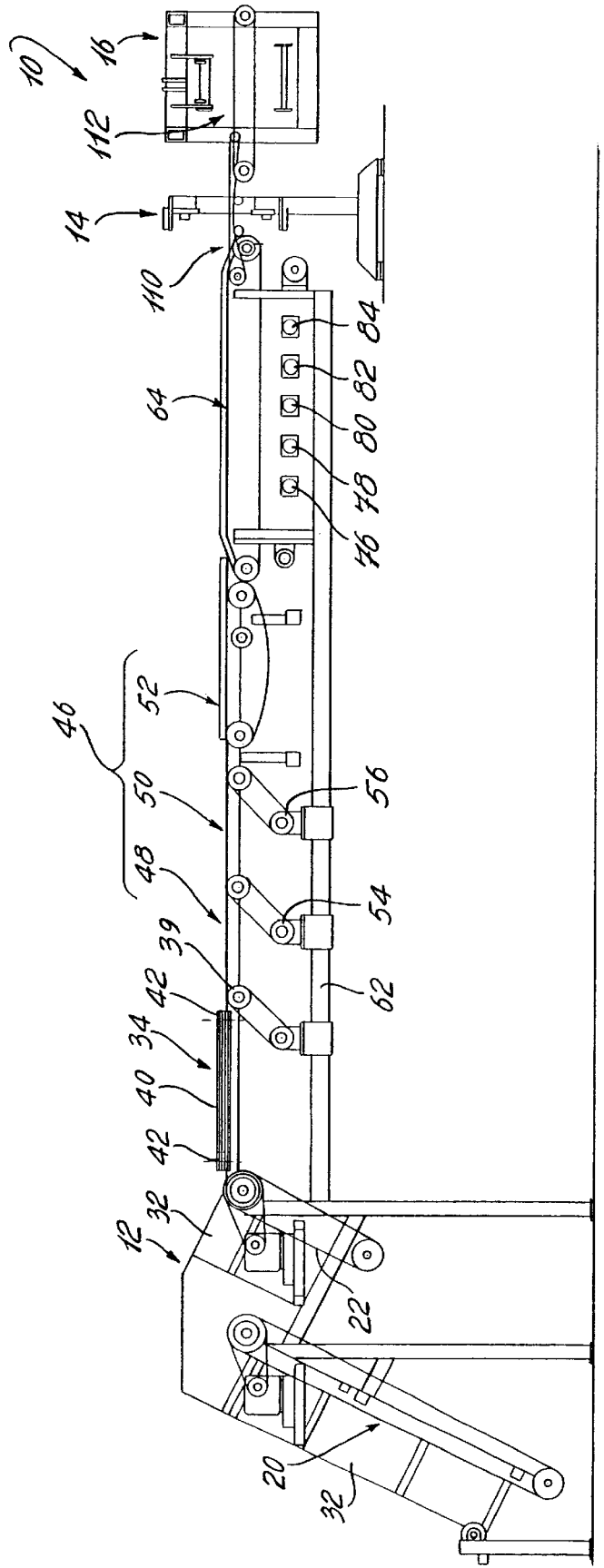
FIG. 2 is a schematic side elevational view of the wood edger of FIG. 1.

As seen in FIGS. 1 and 2, the intake station 12 includes two consecutive inclined multiple chain conveyors 20 and 22. The multiple chain conveyor 20 comprises a number of parallel endless chains 24 which are driven in unison by means of driving sprockets engaged with the endless chains 24 at the delivery end of the first multiple chain conveyor 20. Similarly, the multiple chain conveyor 22 is provided with a number of parallel endless chains 28 which are driven by means of driving sprockets 30 engaged with the chains 28 at the delivery end of the multiple chain conveyor 22. The cants C to be processed are transversally dragged one by one along the supporting surfaces of the inclined multiple chain conveyors 20 and 22 by attachments inserted at intervals in the endless chains 24 and 28. Lateral guide plates 32 are also provided along the sides of the multiple chain conveyors 20 and 22 to keep the cants C from running off.

The cants C are then successively transferred to an aligning station 34 where an operator may intervene to remove non-desired cants and properly position the same, if need be. The aligning station 34 consists of a horizontal multiple chain conveyor that is composed of a plurality of parallel endless chains 36 driver in unison by sprockets 38 mounted on a driving shaft 39 disposed at a delivery end of the aligning station 34. Driven spiral rolls (not shown) are mounted in the endless chains 36 and are driven in synchronism therewith. A driven endless chain 40 engaged at opposed ends thereof with sprockets 42 mounted on vertical shafts is provided along one side of the aligning station 34 to cooperate with the spiral rolls (not shown) in aligning one end of the cants along a common reference line extending in the feeding direction on the opposed side of the aligning station 34. It is noted that, according to the illustrated embodiment, the driven endless chain 40 forms and angle of about 6° with the feeding direction of the cants C.

From the aligning station 34, the successive cants C are discharged to a spacing station 46 which includes a series of three multiple chain conveyors 48, 50 and 52 independently driven by respective motors 54, 56 and 58 to move the cants C transversally of their longitudinal axes. The multiple chain conveyors 48, 50 and 52 each comprise a plurality of parallel endless chains 60 disposed in a laterally spaced-apart relationship on a frame structure 62. The spacing station 46 further includes a sensing system (not shown) which is coupled to the control system (not shown) to analyse the space between the cants C. Accordingly, for two successive cants, the control system computes the distance existing between the cants C and consequently increases or reduces the feeding speed of the conveyor on which the upstream or second cant is supported such as to provide a desired space between the two. More generally, it can be said that based on the sensing data, the control system creates a differential of speed through the conveyors so as to obtain a desired spacing between the cants C. It is understood that different numbers of conveyors may be provided to obtain the intended result.

In the event that two cants C overlap, the operator can reduce the speed of the preceding conveyor in order to create a required space for the cant C in excess. Then, the operator may place the excess cant behind the first cant. Therefore, this permits to maintain a substantially uniform space between the cants.

It is also noted that, since the movement of the cants C is continuous, it is possible to reduce the average speed of the multiple chain conveyors 48, 50 and 52, thereby facilitating the transportation of the cants C and the work of the operator.

Moreover, another advantage of the present invention resides in the fact that the empty spaces, due to loading problems that occurred at the intake station 12 and to rejections of deficient cants by the operator, may be filled by adjusting the relative speed of the multiple chain conveyors 48, 50 and 52.

The cants C are then transferred one by one from the spacing station 46 to a scanner infeed station 64. The scanner infeed station 64 consists of a feeding apparatus comprising a frame 65 on which a plurality of parallel endless chains are disposed in a laterally spaced-apart relationship. Referring now more specifically to FIG. 3, it can be seen that the endless chains are grouped in five sets of three chains identified by reference numerals 66, 68, 70, 72 and 74, the chains of a same set being driven in unison by a common motor. Accordingly, the sets of chains 66, 68, 70, 72 and 74 are driven by respective motors 76, 78, 80, 82 and 84. The motors 76, 78 80, 82 and 84 are coupled to respective driving shafts 86, 88, 90, 92 and 94 extending transversally of the longitudinal axis of the chains. The driving shafts 86, 88, 90, 92 and 94 are provided with respective sets of three sprockets 96, 98, 100, 102 and 104 distributed along the length thereof such as to engage the set of chains associated therewith. The chains are provided with attachments 106 for engaging and moving the cants C forward. The cants C are transported above the chains on a plurality of longitudinal rails 108 extending along the sides of the chains.

A sensing system (not shown) adapted to detect the space between the cants C emanating from the last multiple chain conveyor 52 of the spacing station 46 commands, through the control system, the successive activation of the sets of chains 66, 68, 70, 72 and 74 to transport one cant at a time in front of the scanning station 14. Each set of chains 66, 68, 70, 72, 74 accumulates one cant. The sensing system is further adapted to ascertain the width of the incoming cants in order to control the relative position of the attachments 106 of the sets of chains 66, 68, 70, 72 and 74. Accordingly, a uniform space between adjacent cants accumulated on the upstream side of the scanning station 14 is provided. As the set of chains 66, 68, 70, 72 and 74 are independently driven, it is possible to vary the speed thereof according to the number of cants waiting in front of the scanning station 14. The scanner infeed station 64 also optimises the productivity of the wood edger 10 in that it increases the rate at which shorter cants are fed. Indeed, it is advantageous to be able to vary the advancing speed of the cants, as shorter cants require less time to be processed.

FIG. 3 illustrates two successive cants C and C' which are moved transversally of their longitudinal axes toward the scanning station 14 by the first set of chains 66 and the second set of chains 68, respectively. The chains of the first set 66 are driven in unison to cooperate in transporting the cant C by means of their attachments 106*a*. Similarly, the chains of the second set 68 are driven in unison to cooperate in transporting the cant C' by means of the attachments 106*b*. The attachments 106 of the first and second sets of chains 66 and 68 are respectively engaged at three spaced-apart locations on a longitudinally extending upstream surface of the cants C and C' to push the same forward. The relative speed of the first and second set of chains 66 and 68 is controlled so as to provide a uniform feeding rate, as explained hereinbefore. Indeed, the cant C and C' may be simultaneously supported on the snapper infeed station 64, while not being advanced at the same speed.

It is understood that the number of sets of chains and the quantity of chains per set may vary in accordance with the length of the cants and the number of cants to be accumulated in front of the scanning station 14. It is noted that the sets of chains 66, 68, 70, 72 and 74 could be replaced by corresponding sets of endless belts.

From the scanner infeed station 64, the cants C are transferred onto a conveyor 110 extending through the scanning station 14. The conveyor 110 is composed of at least two laterally spaced-apart parallel endless chains or belts driven in unison. The speed of the conveyor 110 may be adjusted in accordance with the desired number of cants to be processed per minute.

The cants C carried by the conveyor 110 through the scanning station 14 are optically scanned to detect the profile thereof. As mentioned hereinbefore, the data obtained during scanning are processed by the control system (not shown) to establish the orientation of the cants and the position of the circular-saws (not shown) of the edging station 18.

Once a cant has been scanned, it is positioned onto the edger infeed table 16 by an edger positioning apparatus 112.

As seen in FIG. 1, the edger positioning apparatus 112 comprises three modules 114 which are disposed in lengthwise parallel laterally spaced relation to one another on a downstream side of the scanning station 14. It is noted that depending on the length of the cant emanating from the scanning station 14, only the two modules 114 that are nearest to the ends of the cant may be operated by the control system (not shown) to position the cant on the edger infeed table 16.

Referring now more specifically to FIG. 4, it can be seen that each module 114 includes first and second side by side extending conveyors 116 and 118 which are driven by respective reversible motors 120 and 122. Each module 114 further includes a supporting member 123 disposed between the first and second conveyors 116 and 118 to fill the gap between the delivery end of the conveyor 110 and the edger infeed table 16. The first conveyor 116 includes an endless belt 124 having three cant engaging members 126a, 126b and 126c secured at regular interval thereon. Similarly, the second conveyor 118 includes an endless belt 128 having three cant engaging members 130a, 130b and 130c secured at regular intervals thereon. Each cant engaging member 126, 130 has a front pushing side 132 and a rear abutment side 134.

In operation, as shown in FIG. 7a, a sensor (not shown) disposed in the area of the delivery end of the conveyor 110 and the receiving end of the edger positioning apparatus 112 detects the presence of a cant C and then sends a signal to the control system (not shown) to activate the first conveyor 116 of at least two modules 114 such as to position the front pushing side 132 of the cant engaging member 126a thereof adjacent an upstream longitudinal surface of the cant C. The cant C is then pushed by the cant engaging members 126a.

At this time, the second conveyor 118 of each elected module 114 is not activated and thus the cant engaging member 130a is immobile at a certain distance downstream of the cant C. As the control system (not shown) has already obtained and analysed the profile data of the cant C, it can control the speed and the advancement of the second conveyors 118 such as to properly wedge the cant C between the front pushing side 132 of the cant engaging member 126a of each operated first conveyor 116 and the rear abutment side 134 of the cant engaging member 130a of each operated second conveyor 118, as illustrated in FIG. 7b. It is noted that the wedging operation of the cant C is effected while the first conveyors 116 are driven to move the cant C toward the cant engaging member 130a of the second conveyors 118.

Once the cant C is properly held in position between the cant engaging members 126a and 130a, the first and second conveyors 116 and 118 are driven in unison to transversally transport the cant onto the edger infeed table 16, as illustrated in FIG. 7c. The alignment and the position of the cant C with respect to the circular-saws (not shown) of the edging station 18 are controlled by the control system which positions the first and second conveyors 116 and 118 of the elected modules 114.

For the sequence illustrated in FIGS. 7a to 7c, the cant engaging members 126a serve as pushing members behind the cant C, whereas the cant engaging members 130a serve as abutment members in front of the cant C.

Figure 7D:
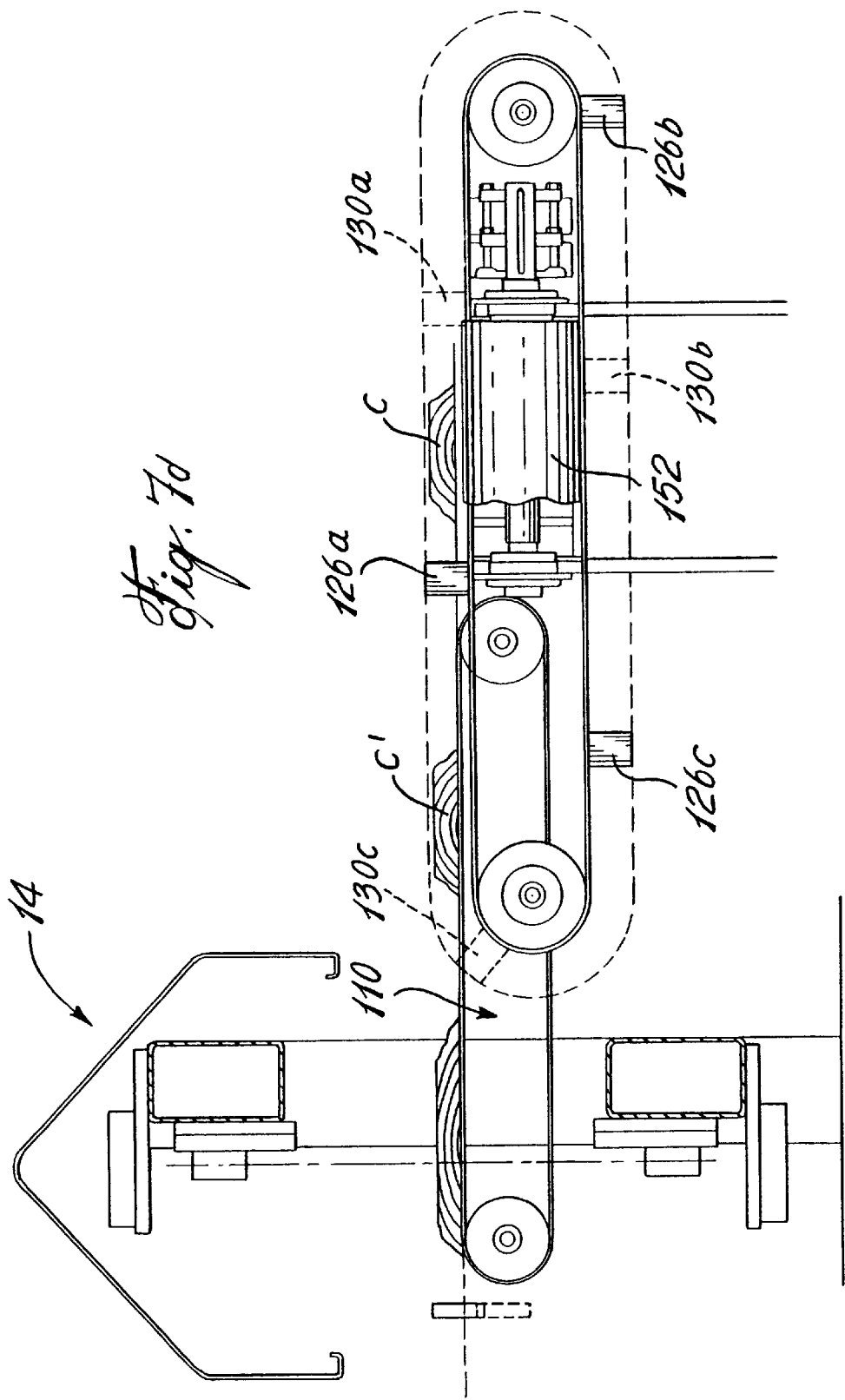

Once the cant C has been positioned on the edger infeed table 16, the first conveyors 116 are driven backward, while the second conveyors 118 are driven forward, as illustrated in FIG. 7d. At this stage, the cant engaging members 126a will serve as abutment members for the next incoming cant C', whereas the cant engaging members 130a will eventually return to the receiving end of the edger positioning apparatus 112 to push an incoming cant.

The cant engaging member 130c of the second conveyors 118 and the cant engaging member 126a of the first conveyors 1116 will then cooperate to move the next incoming cant C' as per the way described hereinbefore.

Accordingly, it can be said that the cant engaging members 126 and 130 alternately serve to push and retain the cants.

FIGS. 5 and 6 illustrate, in greater detail, the construction of the cant engaging members 126 and 130. More particularly, each cant engaging member 126, 130 includes a base portion 136 and an upwardly protruding portion 138 extending substantially at right angle therefrom. A sleeve member 140 fitted over the upwardly protruding member 138 is normally urged in a forward position relative thereto by two compression springs 142 extending from two vertically spaced-apart horizontal bores 144 defined in a front surface of the upwardly protruding portion 138.

This construction provides a front pushing side 132 which is compressible to compensate for inaccurate positioning of the cant engaging members 126 and 130 by the control system, while still having a rigid rear abutment side 134 to retain the cant.

The first and second conveyors 116 and 118 are provided with lateral guides 146 which extend on the sides of the belts 124 and 128 to laterally restrain the motion of the cant engaging members 126 and 130. The lateral guides have an L-shaped configuration and include a portion which extends above the base portion 136 of the cant engaging members 126 and 130 to limit upward movements thereof.

It is understood that the number of modules 114 of the edger positioning apparatus 112 may be different than three and that the first and second conveyors 116 and 118 thereof may consist of chain conveyors instead of belt conveyors. Furthermore, the number of cant engaging members per conveyor could be less or more than three.

As seen in FIGS. 4 and 6, the edger infeed table 16 includes a number of retractable cant supports 148 which are adapted to receive the cants from the edger positioning apparatus 112. The retractable cant supports 148 are disposed near the modules 114 of the edger positioning apparatus 112 and are rockable between raised and lowered positions about axes which are parallel to the feeding direction of the edger positioning apparatus 112. The retractable cant supports 148 enable to temporarily maintain the cant above a conveying surface 150 of the edger infeed table 16.

The conveying surface 150 of the edger infeed table 16 is composed of a number of driven rollers 152 which are disposed between the modules 114 of the edger positioning apparatus 112 for longitudinally accelerating the cants in a direction transversal thereto.

As seen in FIG. 2 the edger infeed table 16 further includes a series of overhead pressing rollers 154 which are adapted to engage an upper surface of the cants C to guide the same into the edging station 18.

Figures 8A, 8B:
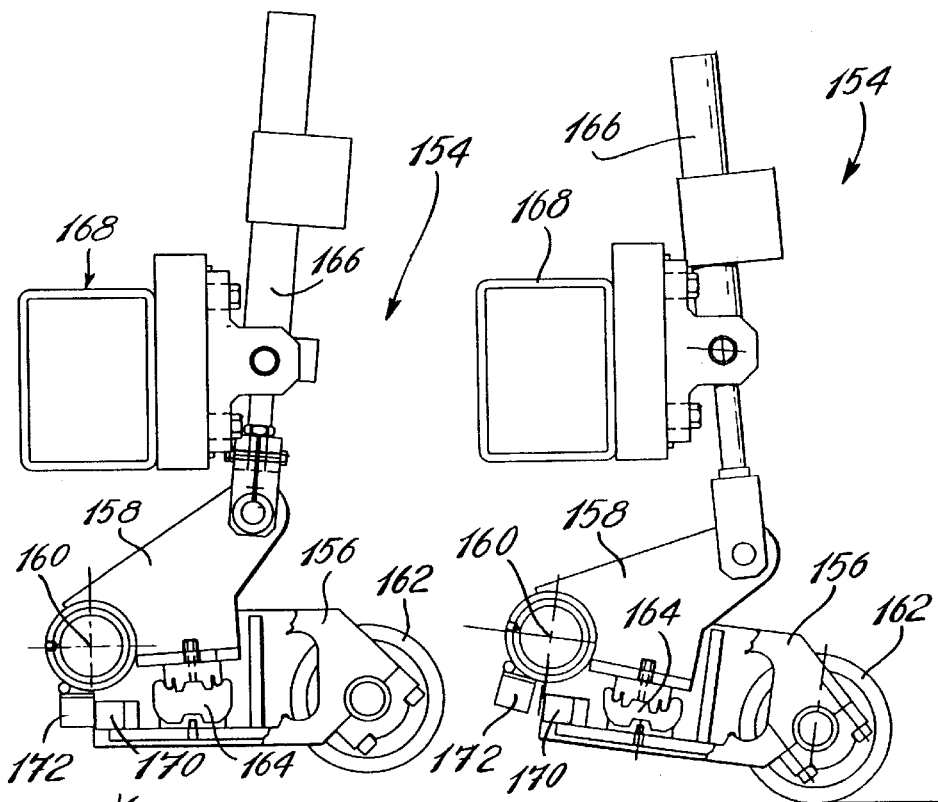
FIGS. 8a and 8b are side elevational views of an overhead pressing roller of the edger infeed table respectively shown in an inoperative position and an operative position thereof.
Figure 9:
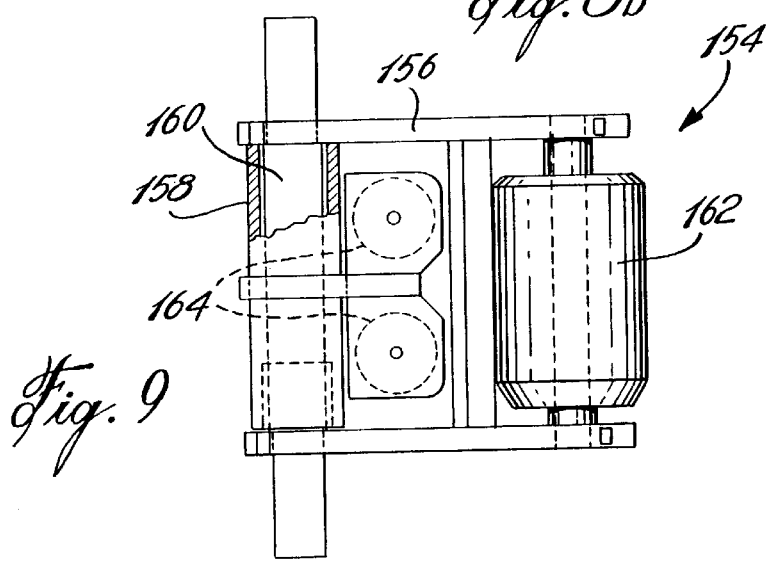
FIG. 9 is a top plan view of the pressing roller of FIGS. 8a and 8b.

Referring now more specifically to FIGS. 8 and 9, each overhead pressing roller includes first and second frame members 156 and 158 which are pivotally mounted on a common pivot 160. The first frame member 156 supports at a first end thereof a roller 162 which is adapted to roll on the top surface of the cants.

A pair of pneumatic bladders 164 is disposed between the first and second frame members 156 and 158 of each overhead pressing roller 154 to act as a damping member in order, to absorb vibrations transmitted to the roller 162. The pressure inside the bladders may vary to adjust the pressure of the roller 162 on the cants C. The damping member could also be other means, such as hydraulic and pneumatic cylinders, springs and resilient links.

As seen in FIGS. 8a and 8b, each overhead pressing roller 154 includes a pneumatic or hydraulic cylinder 166 which is pivotally mounted to a main frame structure 168 of the infeed table 16 to act on the second frame member 158 such as to selectively raise and lower the roller 162 in an inoperative position wherein the roller 162 is out of engagement with the cant and an operative position wherein the roller 162 engages a top surface of the cants.

The first and second frame members 156 and 158 are provided with cooperating abutment members 170 and 172 which are adapted to assist the cylinder 166 in maintaining and displacing the roller 162 in the inoperative position thereof.

In operation, the cant is maintained above the driven rollers 152 by the retractable cant supports 148 to permit the cant engaging members 126 and 130 to move away from the cant and the overhead pressing rollers 154 to reach their operative position. Then, the retractable cant supports 148 are pivoted to their lower position to permit the engagement of the cant C by the driven rollers 152.

The cant C is then longitudinally translated through the edging station 18 where circular-saws (not shown) trim the unfinished longitudinal wane surfaces of the cant C.

The edged cant can then be transferred to a discharge table 174 where it can be conveyed to an appropriate storing facility.

It is noted that the present invention has been described in the context of a sawmill, since the transfer and orientation of a wood cant particularly exemplifies the problems to which the present invention is directed. However, it is understood that the invention is applicable to workpieces other than wood cants, such as, for instance, elongated steel elements produced during rolling mill operations.

What is claimed is:

1. An apparatus for transferring and orienting successive cants, comprising at least two axially extending conveyors disposed in lateral spaced-apart relationship for moving successive incoming cants in a direction transversal to respective longitudinal axes of the incoming cants, each said conveyor including first and second endless driving members selectively independently movable in one of a forward direction and a backward direction, said first and second endless driving members being respectively provided with at least one first engaging member and with at least one second engaging member, said first and second engaging members being adapted to cooperate to convey successive incoming cants in said forward direction, said first and second engaging members each having opposed pushing and abutment sides, said first and second endless driving members of said conveyors being independently driven in a selected one of the forward direction and the backward direction by individual reversible motors, thereby allowing the engaging members on one side of the cant to be located at different axial locations relative to a direction of travel in order to compensate for surface irregularities along the sides of the cant, and a controller controlling the operation of said conveyors such as to transport successive incoming cants by alternately wedging the same between said pushing side of said first engaging member and said abutment side of said second engaging member, and between said pushing side of said second engaging member and said abutment side of said first engaging member.

2. An apparatus as defined in claim 1, wherein said pushing side of each said first and second engaging members is provided with compressible means, whereas said abutment side thereof is substantially rigid.

3. An apparatus as defined in claim 2, wherein said first and second engaging members each include an upwardly protruding portion and a sleeve member fitted over said upwardly protruding portion, and wherein said compressible means of each said first and second engaging members include spring means extending forwardly from said upwardly protruding portion to normally urge a rear surface of a front portion of said sleeve member away from said upwardly protruding portion.

4. An apparatus as defined in claim 3, wherein said spring means of each said first and second engaging members include at least one compression spring mounted in a substantially horizontal receiving bore defined in said upwardly protruding portion, said receiving bore having a depth which is less than a longitudinal dimension of said compression spring under static conditions.

5. An apparatus as defined in claim 4, wherein there is provided two of said compression springs for each said first and second engaging members, said compression springs being vertically spaced-apart.

6. An apparatus as defined in claim 1, wherein said reversible motor means includes a distinct reversible motor for each said first and second endless driving members.

7. An apparatus as defined in claim 1, wherein said controller includes sensing means for detecting an incoming cant and establishing the profile thereof.

8. An apparatus as defined in claim 7, wherein there are three conveyors disposed in a laterally spaced-apart relationship, and wherein said controller is configured to activate the conveyors that are closest to opposed extremities of an incoming cant to move the same forward.

9. An apparatus as defined in claim 1, wherein said at least two conveyors each include a transporting surface for supporting the cants above said first and second endless driving members, while the cants are being moved by said first and second engaging members.

10. An apparatus as defined in claim 1, wherein axially extending guide means are provided on each side of said first and second endless driving members for guiding said first and second engaging members.

11. An apparatus as defined in claim 10, wherein said first and second engaging members each include a base portion respectively secured to said first endless driving member and said second endless driving member, said base portion being laterally and upwardly restrained by said guide means.

12. An apparatus as defined in claim 1, wherein at least three first engaging members are provided at substantially regular interval on said first endless driving member, and wherein at least three second engaging members are provided at substantially regular interval on said second endless driving member, each said first and second engaging members acting as an abutment for an incoming cant after having exerted a pushing action with said pushing side thereof on a preceding incoming cant.

13. An apparatus for transferring and orienting successive cants, comprising at least two independent conveyor runs, each conveyor run having independent driving capability and being movable in one of a forward and a backward direction, each independent conveyor run having at least one engaging member so that the engaging members of the conveyor runs cooperate together to engage a cant by wedging the cant between opposing engaging members, both moving in opposing directions with respect to one another, said engaging members on one side of the cant being individually movable to varying axial locations relative to a direction of travel for compensating for irregular cant sides, and a controller controlling the operation of the conveyor runs so as to transport successive incoming cants by alternately wedging the cants between a pushing side of one engaging member and an abutment side of another opposing engaging member on a separate conveyor run.

* * * * *